W. C. MANGEL.
TRAILER ATTACHMENT FOR AUTOMOBILES.
APPLICATION FILED JUNE 18, 1917.

1,272,487.

Patented July 16, 1918.
2 SHEETS—SHEET 1.

Inventor
W. C. Mangel,

By C. L. Parker, Attorney

W. C. MANGEL.
TRAILER ATTACHMENT FOR AUTOMOBILES.
APPLICATION FILED JUNE 18, 1917.

1,272,487.

Patented July 16, 1918.
2 SHEETS—SHEET 2.

Inventor
W. C. Mangel,

By C. L. Parker,
Attorney

UNITED STATES PATENT OFFICE.

WALLIE C. MANGEL, OF FAIRFAX, MINNESOTA, ASSIGNOR OF ONE-HALF TO EDWARD F. BERKNER, OF SLEEPY EYE, MINNESOTA.

TRAILER ATTACHMENT FOR AUTOMOBILES.

1,272,487.

Specification of Letters Patent.   Patented July 16, 1918.

Application filed June 18, 1917.   Serial No. 175,413.

*To all whom it may concern:*

Be it known that I, WALLIE C. MANGEL, a citizen of the United States, residing at Fairfax, in the county of Renville and State of Minnesota, have invented certain new and useful Improvements in Trailer Attachments for Automobiles, of which the following is a specification.

My invention relates to improvements in trailer attachments for automobiles, of the general type which embody an axle, carrying wheels which are driven from the rear axle of the automobile.

An important object of the invention is to provide apparatus of the above mentioned character, adapted for use in connection with an automobile, for increasing the utilization of the power derived from the engine and thus enabling the automobile to be successfully operated in mud or the like.

A further object of the invention is to provide means for connecting or coupling the apparatus to the front and rear axles of the automobile, thus evenly distributing the strains upon both axles.

A further object of the invention is to provide adjustable means whereby the chain or chains serving to connect the axle of the attachment with the rear axle of the automobile may be readily adjusted or tightened.

Other objects and advantages of the invention will be apparent during the course of the following description.

Figure 1:
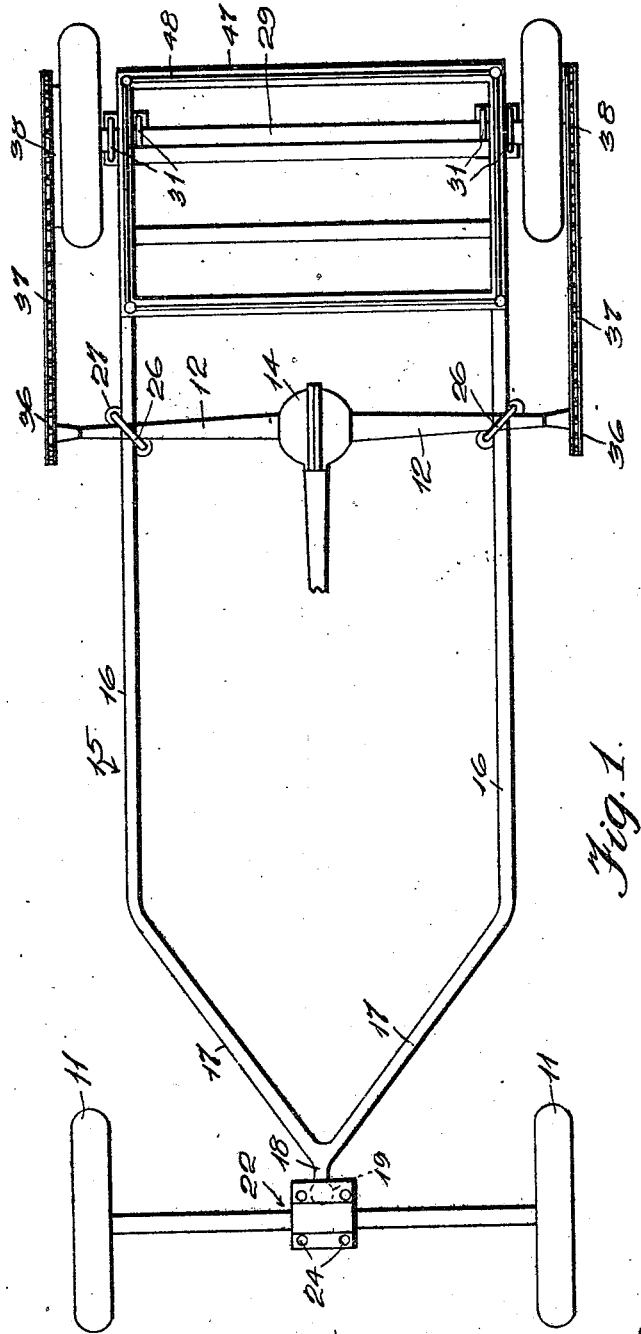
Figure 2:
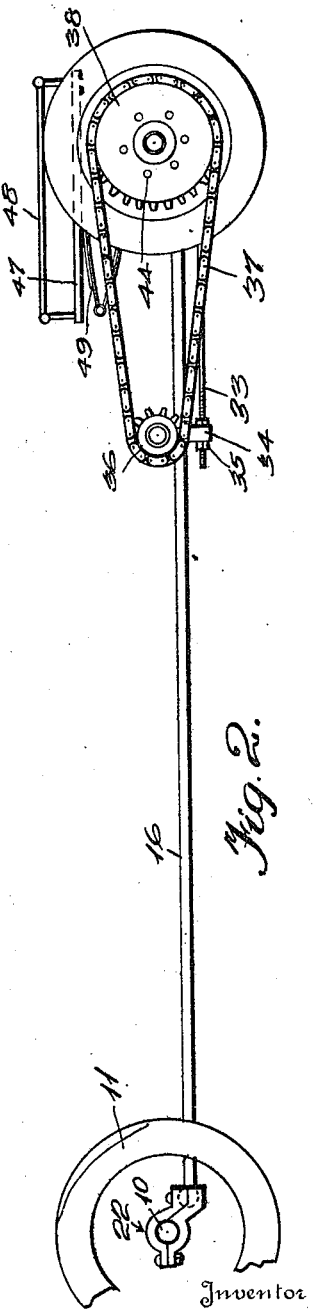
Figure 3:
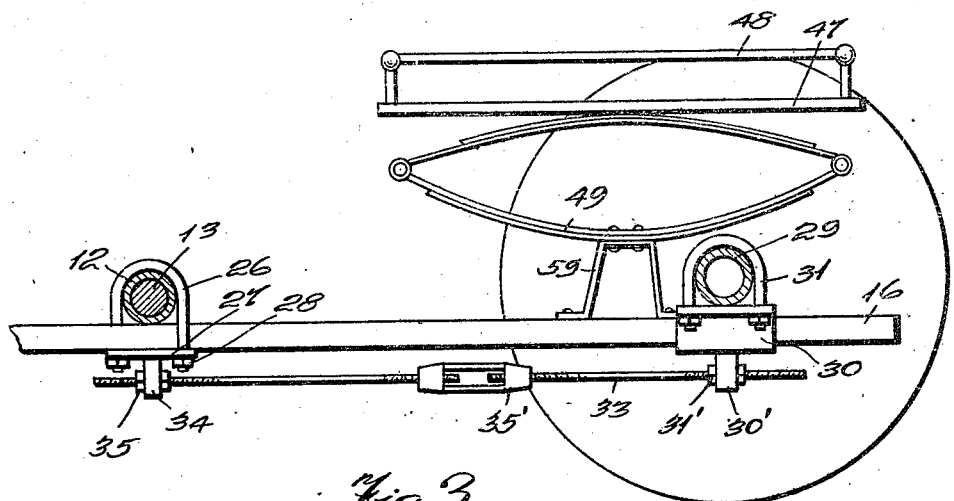
Figure 5:
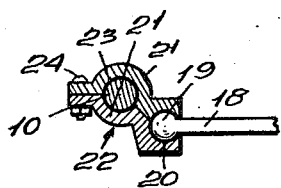
Figure 4:
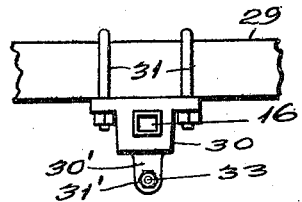
Figure 6:
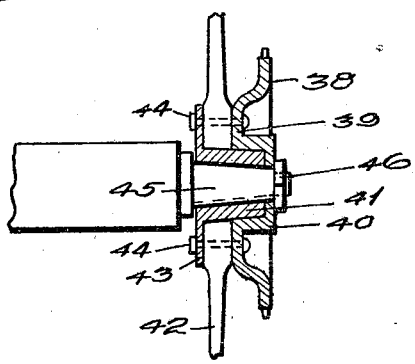

In the accompanying drawings forming a part of this specification and in which like numerals are employed to designate like parts throughout the same, Figure 1 is a plan view of apparatus embodying my invention, Fig. 2 is a side elevation of the same, Fig. 3 is an enlarged fragmentary side elevation of the apparatus, Fig. 4 is an end elevation of an adjustable socket, and associated elements, Fig. 5 is a longitudinal sectional view through an attaching device, or block, and Fig. 6 is a detail sectional view through the axle section of the attachment and associated elements, In the drawings, wherein for the purpose of illustration is shown a preferred embodiment of my invention, the numeral 10 designates the front axle of a Ford automobile, carrying wheels 11. The numeral 12 designates the rear axle casing of the Ford automobile, within which are rotatably mounted axle sections 13, receiving rotation from the differential gear 14, in the usual manner.

My attachment comprises an approximately U-shaped frame 15, including longitudinal preferably tubular bars 16, the forward ends of which converge, at 17, and are provided with a shank 18, carrying a ball 19. This ball is pivotally mounted in a spherically curved recess 20, to turn in all directions, such recess being formed in the inner faces of sections 21 of a clamp 22. This clamp 22 is provided with recesses 23 for receiving the front axle 10, and the sections 21 thereof are securely bound together by bolts 24.

The longitudinal bars 16, more clearly shown in Figs. 2 and 3, project beneath the axle casing 12, and are clamped thereto by U-bolts 26, passing through plates 27, and carrying nuts 28.

The attachment has an axle casing 29, which is arranged above and clamped to sockets 30, by U-bolts 31. The sockets are longitudinally adjustably mounted upon the rear ends of the longitudinal beams 16, as shown. The sockets 30 are longitudinally adjusted by means of rigid rods 33, having their rear ends extending through apertured knuckles 30', formed integral with the sockets 30. Arranged upon opposite sides of the knuckles 30' are nuts 31', having screw-threaded engagement with the rear ends of the rods 33. The forward ends of these rods extend through apertured knuckles 34, formed integral with and depending from the plates 27. The forward ends of the rods 33 are screw-threaded for receiving nuts 35, as shown. Each rod 33 is preferably formed in two sections, the inner ends of which have right and left screw-threads, for receiving a turn buckle 35'. It is thus apparent that the rods 33 are longitudinally extensible and thus function to longitudinally adjust the sockets 30, for taking up the slack in sprocket chains, to be described.

The rear wheels of the automobile are removed from the axle sections 13 and sprocket wheels 36 keyed to said axle sections 13 for rotation therewith. These sprocket wheels are engaged by sprocket chains 37, extending rearwardly for engagement with sprocket wheels 38.

The sprocket wheels 38, as more clearly shown in Fig. 6, embody a body portion or plate 39 and a hub 40. The hub 40 is adapted to be inserted upon a hub 41 of a wheel 42. The hub 41 has an inner plate or flange 43. The plates 39 and 43 hold the spokes of the wheel therebetween and are rigidly connected by bolts 44. The hubs 41 are carried by axle sections 45, rotatably mounted within the axle casing 29. The hubs 41 are held upon the axle sections 45 by nuts 46 or the like. It is thus apparent that the sprocket wheels 38 are rotatable with the rear wheels 42, and receive their rotation from the sprocket wheels 36.

There are two axle sections 45 (see Fig. 6) and these axle sections are pivoted within the axle casing 29 and are independently rotatable. It is thus apparent that the differential gear 14 can function in the ordinary manner, whereby one traction wheel 42 may be rotated faster than the other, as when the apparatus is traveling around a curve.

Arranged above the rear ends of the beams 16 is a body portion or supporting member 47, having a retaining rail 48. The body portion 47 is supported by springs 49, secured to brackets 59, in turn attached to the rear portions of the beams 16.

In view of the foregoing description it is thought that the operation of the apparatus is obvious and that it would therefore be unnecessary to state the same.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In apparatus of the character described, the combination with a main frame, of means for pivotally connecting the forward end of the main frame with the forward axle of an automobile, means for clamping the frame to the rear axle of the automobile, independently rotatable axle sections carried by the main frame and adapted to have the rear wheels of the automobile rigidly secured thereto, sprocket wheels connected with said rear wheels for rotation therewith, sprocket wheels carried by the axle sections of the rear axle of the automobile, and sprocket chains connecting the first and second named sprocket wheels.

2. In apparatus of the character described, a main frame, a tubular housing extending transversely of the main frame and secured to the rear end of the main frame, a pair of axle sections independently rotatable in the tubular housing and having outer tapered ends, traction wheels having tapered tubular hubs provided with inner annular flanges and adapted to be arranged upon the tapered ends of the axle sections, sprocket wheels having body portions arranged upon the opposite sides of the wheels in opposition to the flanges and having tubular hubs to receive the first named tubular hubs, a plurality of bolts connecting the flanges and the body portions of the sprocket wheels, a plurality of nuts having screw-threaded engagement with the ends of the outer tapered portions of the axle sections to retain the parts of the traction wheels thereon, means to pivotally connect the forward end of the main frame with the front axle of an automobile, means for connecting the rear portion of the main frame with the rear axle casing of the automobile, sprocket wheels adapted for connection with the axle sections arranged within the rear axle casing of the automobile, and sprocket chains connecting the two sets of sprocket wheels.

3. A trailer attachment for automobiles, comprising a main frame, means for connecting the main frame with the automobile, independently rotatable axle sections carried by the main frame and adapted to have the rear wheels of the automobile rigidly secured thereto, sprocket wheels connected with said rear wheels for rotation therewith, sprocket wheels carried by the axle sections of the rear axle of the automobile, and sprocket chains connecting the first and second named sprocket wheels.

4. A trailer attachment for automobiles, comprising a main frame, means for connecting the main frame with the automobile, independently rotatable axle sections carried by the main frame and adapted to have the rear wheels of the automobile rigidly secured thereto, and gearing connecting the axle sections of the rear axle of the automobile with the said rear wheels.

In testimony whereof I affix my signature in presence of two witnesses.

WALLIE C. MANGEL.

Witnesses:
FRANK HOPKINS,
GLADYS HOPKINS.

Copies of this patent may be obtained for five cents each, by addressing the "Commissioner of Patents, Washington, D. C."